United States Patent Office 2,891,056
Patented June 16, 1959

2,891,056

WATER-SOLUBLE ALLYL ETHYL CELLULOSE AND ITS PREPARATION

Romeo B. Wagner, Wilmington, Del., assignor to Hercules Powder Company, Wilmington, Del., a corporation of Delaware No Drawing. Application December 5, 1956
Serial No. 626,285

6 Claims. (Cl. 260—231)

This invention relates to cellulose ethers and more particularly to a process of preparing water-soluble allyl ethyl cellulose and the resulting product.

Heretofore there have been several attempts to prepare an organosoluble cellulosic which would undergo controlled oxidative polymerization. Allyl groups have been introduced into cellulose for this purpose; however, premature insolubilization has seriously complicated and often prevented the manufacture of a satisfactory product. Allyl cellulose having a D.S. of 1.0–2.6 loses its sensitivity to organic solvents in the presence of air, and this premature insolubilization is greatly accelerated by light and heat. Thus, it would be highly desirable to prepare a water-soluble allyl cellulosic which would remain water-soluble as long as desired but which could be rendered permanently insensitive to water and organic solvents when desired, say for use as a film former and the like.

It has been found according to the present invention that a cellulosic, namely allyl ethyl cellulose, having the above mentioned desirable characteristics can be prepared by subjecting a mixture of alkali cellulose, an allyl halide and an ethyl halide to appropriate conditions of temperature and pressure in an autoclave. The fibrous allyl ethyl cellulose product is recovered by removing by-products, unreacted halides, excess alkali and water from the reaction mixture.

The following examples, wherein percent is by weight unless otherwise indicated, illustrate specific ways in which the invention has been practiced.

EXAMPLE 1

First alkali cellulose was prepared. Thus, cellulose sheets (194 grams) were steeped in 30% aqueous sodium hydroxide for 3 hours at room temperature. The sheets were pressed at 6,000 p.s.i. to a weight of 467 grams and shredded for 2 hours with water cooling in a Baker-Perkins shredder. The press weight ratio of the alkali cellulose was 2.6, i.e., this was the weight ratio of the pressed alkali cellulose to the original cellulose. The composition of the resulting alkali cellulose was as follows:

39.1% cellulose
23.1% sodium hydroxide
0.15% sodium carbonate
37.6% water
0.59 ratio sodium hydroxide/cellulose
0.96 ratio water/cellulose
38.2% sodium hydroxide concentration A 500 ml. Monel autoclave containing a metal slug was charged at 5° C. with 26 grams of the above alkali cellulose, 90 grams (98 ml.) ethyl chloride and 4.7 grams (5 ml.) of freshly distilled allyl chloride. The autoclave was then sealed with a Teflon gasket and tumbled in an oil bath at 110° C. for 2.5 hours. Then the autoclave was removed and cooled in an ice bath. Excess halides were removed by decantation, and the product was further purified by heating to 90° C. The combined solid material from two such runs was collected on a hot sintered-glass funnel, slurried successively with 100 ml., 100 ml., and 50 ml. portions of water at 95° C. and followed immediately by suction. The product was washed with 200 ml. of acetone to remove water and then dried. The final product was in fibrous form and substantially free of chloride.

Details for the preparation of Example 1 product are given in Table 1 hereinafter, and properties of the product are given in Table 2 hereinafter.

EXAMPLES 2–11

Ten additional runs were made and as described above for Example 1 except for the differences shown in Table 1. All of the above runs are shown as Examples 1–11 in Tables 1 and 2 hereinafter.

*Table 1.—Preparation of allyl ethyl celluloses*

| Example [1] | Alkali Cellulose Composition | | | Amount of Reagents Used | | | Weight Ratio of Reactants | | | Yield, Percent | Efficiency (Percent) | |
|---|---|---|---|---|---|---|---|---|---|---|---|---|
| | NaOH Cell. | Water Cell. | Percent NaOH | Alkali Cellulose, Wt. (g.) | Ethyl Chloride, Ml. | Allyl Chloride, Ml. | Ethyl Chloride Cellulose | Allyl Chloride Cellulose | Ethyl Chloride, Allyl Chloride | | Ethylation | Allylation |
| (1) | 0.59 | 0.96 | 38.2 | 26.0 | 98 | 5 | 9 | 0.22 | 19 | 75 | 28 | 22 |
| 2 | 0.67 | 1.02 | 39.7 | 50.0 | 200 | 5 | 10 | 0.25 | 39 | 56 | 36 | 28 |
| 3 | 0.67 | 1.02 | 39.7 | 50.0 | 200 | 10 | 10 | 0.51 | 20 | 64 | 33 | 24 |
| 4 | 0.67 | 1.02 | 39.7 | 50.0 | 200 | 15 | 10 | 0.76 | 13 | 63 | 30 | 19 |
| 5 | 0.67 | 1.02 | 39.7 | 50.0 | 200 | 20 | 10 | 1.02 | 10 | 67 | 24 | 20 |
| (6) | 0.67 | 1.02 | 39.7 | 150 | 500 | 5 | 8.3 | 0.09 | 98 | 69 | 40 | 39 |
| (7) | 0.67 | 1.02 | 39.7 | 150 | 500 | 10 | 8.3 | 0.17 | 49 | 66 | 40 | 28 |
| (8) | 0.67 | 1.02 | 39.7 | 150 | 500 | 20 | 8.3 | 0.34 | 25 | 71 | 35 | 27 |
| (9) | 0.67 | 1.02 | 39.7 | 150 | 500 | 30 | 8.3 | 0.51 | 16 | 70 | 36 | 21 |
| 10 | 0.65 | 1.14 | 36.2 | 140 | 500 | 10 | 9.2 | 0.19 | 49 | | 36 | 21 |
| 11 | 0.65 | 1.14 | 36.2 | 140 | 500 | 10 | 9.2 | 0.19 | 49 | | 42 | 22 |

[1] In the examples marked by parenthesis, aged alkali cellulose was employed. In Example 1 the alkali cellulose was aged for one year in air at 3° C., and in Examples 6, 7, 8 and 9 it was aged for 64 hrs. in an oxygen atmosphere at room temperature. The alkali cellulose in these examples is from four batches. Example 1 is from one batch, Examples 2–5 are from a second batch, Examples 6–9 are from a third batch, and Examples 10 and 11 are from a fourth batch. The third batch was prepared by aging the second batch.

Table 2.—Properties of allyl ethyl celluloses

| Example | Substitution | | Percent Soluble in Water at 3° C.[1] | Percent Insolubilized on Heating with Potassium Persulfate [2] |
|---|---|---|---|---|
| | Ethyl D. S. | Allyl D. S. | | |
| 1 | 0.68 | 0.21 | Soluble in as high as a 5% solution. | Largely insolubilized using 0.5% based on allyl ethyl cellulose. |
| 2 | 0.95 | 0.15 | 100 | |
| 3 | 0.86 | 0.26 | 76 | |
| 4 | 0.76 | 0.31 | 57 | |
| 5 | 0.60 | 0.44 | 31 | |
| 6 | 1.05 | 0.07 | 100 (at 25° C.) | 70. |
| 7 | 1.00 | 0.10 | 100 | 85. |
| 8 | 0.87 | 0.19 | 100 | 92. |
| 9 | 0.84 | 0.23 | 100 | 95. |
| 10 | 0.91 | 0.085 | | |
| 11 | 1.05 | 0.09 | | |

[1] Two percent allyl ethyl cellulose solutions were employed in solubility tests.
[2] Five percent potassium persulfate (based on allyl ethyl cellulose) was used except in Example 1 where 0.5% was employed. Solutions were heated up to 50° C.–70° C.

The degrees of substitution (D.S.), or number of allyl groups and ethyl groups per anhydroglucose unit introduced into the cellulose molecule, is critical. The all-important requirement is that the product remain water-soluble until ready for use and then be capable of being permanently insolubilized. Therefore the product must not polymerize to a substantial degree during preparation, storage or any time prior to use. Although the allyl and ethyl D.S. ranges necessary to meet this requirement may vary slightly, depending on the particular conditions used for making the product, generally it has been found that the allyl D.S. must be 0.05–0.5 and preferably about 0.2 and that the ethyl D.S. must be 0.5–1.5 and preferably 0.8–1.1. However, as indicated in Tables 1 and 2 hereinbefore, the degree of polymerization of the product also affects its solubility in water. Consequently, the water-solubility of a product having a given allyl and ethyl D.S. can be increased by decreasing the degree of polymerization, as by employing a cellulose furnish of a lower degree of polymerization and/or by aging the alkali cellulose. For instance, while most of the products of Examples 1–11 require cold water for 100% solubility, a suitable balance of allyl and ethyl D.S. plus appropriate aging of the alkali cellulose to a lower viscosity (Example 6) gives a product which is completely soluble in water at room temperature and, therefore, more desirable for some applications.

As shown in Table 2 the product of this invention is permanently insolublized by heating an aqueous solution thereof to 50° C.–70° C. in the presence of 0.05–5% potassium persulfate by weight of said product. Although the product can be insolubilized without the use of an added catalyst simply by heating in the presence of air, it requires a much longer time which for many uses would be impractical. Applicable catalysts include persulfates, peroxides, and any other materials which will catalyze the polymerization of olefins.

From the foregoing it will be noted that the introduction of the allyl and ethyl groups into the cellulose molecule was accomplished in a single stage operation. While this is by far the preferred way, it is not absolutely necessary since one can ethylate and then allylate. However, in a single stage operation it is much easier to avoid premature insolubilization of the product. Too, it is more economical to ethylate and allylate simultaneously. This reaction may be carried out at a temperature of 90° C.–140° C. and preferably 100° C.–120° C. A reaction time of 1–4 hours is operable and varies inversely with the temperature employed, i.e., the higher the temperature the less time required, and conversely.

As is well known in the cellulose art, the conditions for preparation of the alkali cellulose may vary widely. For instance, while purified cotton linters were used in the examples, other cellulosic materials are suitable, e.g., woody fibers, bast fibers, and the like. An alkali/cellulose ratio of 0.5–0.8 may be used but preferably this ratio will be 0.6–0.7. Likewise, a water/cellulose ratio of 0.2–1.2 is operable but a ratio of about 1 is preferred. It is far more desirable but not necessary that comminuted cellulose be employed. Also those skilled in this art will appreciate that time, temperature, pressure, and concentration of sodium hydroxide employed in the preparation of the alkali cellulose may vary.

Since the solubility of the product of this invention is a factor affecting yields, the yields will vary somewhat depending on the washing procedure employed in purifying the crude product. Like many other cellulose ethers it is more soluble in cold water than in hot water. An allyl ethyl cellulose having an ethyl D.S. up to about 1.2 is more soluble in water than in organic solvents. Above about 1.2 ethyl D.S. it becomes increasingly soluble in organic solvents and less soluble in water. In Examples 1–11 the product was purified by washing with water at 95° C. and with acetone at room temperature, and yields of 56%–75% by weight of ethyl chloride were obtained (Table 1). Since the ethyl D.S. of these products was 0.68–1.05, the yields would be somewhat higher if the crude product were washed with an organic solvent instead of water. Instead of washing with water followed by an organic solvent, the two steps may be combined. The relative proportions of water and organic solvent used will depend on the solubility characteristics of the particular allyl ethyl cellulose being produced. Water-miscible solvents in general are applicable, provided they are inert in the system and do not dissolve out any substantial amount of the product. These solvents include, e.g., acetone, methanol, ethanol, isopropanol, and the like.

The allyl ethyl cellulose product of this invention has a number of important uses, including application as protective coatings and adhesives. To illustrate its use as a protective coating an aqueous solution was prepared, using distilled water, containing 4.4% allyl ethyl cellulose. A film was cast on a silicon-treated chromium surface using a 10-mil casting knife. The film was readily soluble in water, even after allowing to air dry for thirty minutes and then heating in an air-circulating oven for two hours at 150° F. A 2% potassium persulfate solution was laid over half of the film using a 10-mil casting knife. The film was substantially completely insolubilized in water after air drying for two hours and then heating in an air-circulating oven for two hours at 150° F. To illustrate the use of the product as an adhesive, a piece of paper was coated with a 2.5% aqueous solution of the allyl ethyl cellulose of this invention and applied to a smooth glass surface without application of external heat and pressure. An excellent paper-to-glass water-soluble bond resulted. As will be apparent from the above, this water-soluble bond can be insolubilized by heating in the presence of potassium persulfate or other olefin oxidizing agent.

What I claim and desire to protect by Letters Patent is:

1. A process of preparing a water-soluble organoinsoluble allyl ethyl cellulose which is stable to premature insolubilization in water but which when desired for making films and other materials is irreversibly insolubilized by heating in the presence of an oxidizing agent therefor, which process comprises reacting alkali cellulose with an allyl halide and an ethyl halide at a temperature of 90° C.–140° C. for 1–4 hours until the allyl ethyl cellulose product contains 0.05–0.5 allyl group and 0.5–1.5 ethyl groups per anhydroglucose unit of cellulose.

2. A process of preparing a water-soluble organo-insoluble allyl ethyl cellulose which is stable to premature insolubilization in water but which when desired for making films and other materials is irreversibly insolubilized by heating in the presence of an oxidizing agent therefor, which process comprises reacting alkali cellulose with an allyl halide and an ethyl halide at a temperature of 100° C.–120° C. for 1–4 hours until the allyl ethyl cellulose product contains 0.2 allyl group and 0.8–1.1 ethyl groups per anhydroglucose unit of cellulose.

3. A process of preparing a water-soluble organoinsoluble allyl ethyl cellulose which is stable to premature insolubilization in water but which when desired for making into films and other materials is irreversibly insolubilized by heating in the presence of an oxidizing agent therefor, and insolubilizing said allyl ethyl cellulose, which process comprises reacting alkali cellulose with an allyl halide and an ethyl halide until the allyl ethyl cellulose contains 0.05–0.5 allyl group and 0.5–1.5 ethyl groups per anhydroglucose unit of cellulose, and subsequently rendering said allyl ethyl cellulose irreversibly insoluble in water by heating in the presence of an oxidizing agent therefor.

4. A process of preparing a water-soluble organoinsoluble allyl ethyl cellulose which is stable to premature insolubilization in water but which when desired for making into films and other materials is irreversibly insolubilized by heating in the presence of an oxidizing agent therefor, and insolubilizing said allyl ethyl cellulose, which process comprises reacting alkali cellulose with an allyl halide and an ethyl halide at a temperature of 90° C.–140° C. for 1–4 hours until the allyl ethyl cellulose contains 0.05–0.5 allyl group and 0.5–1.5 ethyl groups per anhydroglucose unit of cellulose, and subsequently rendering said allyl ethyl cellulose irreversibly insoluble in water by heating in the presence of an oxidizing agent therefor.

5. A water-soluble organoinsoluble allyl ethyl cellulose which is stable to premature insolubilization in water but which when desired for making into films and other materials is readily made irreversibly insoluble in water by heating in the presence of an oxidizing agent therefor, said allyl ethyl cellulose having 0.05–0.5 allyl group and 0.5–1.5 ethyl groups per anhydroglucose unit of cellulose.

6. A water-soluble organoinsoluble allyl ethyl cellulose which is stable to premature insolubilization in water but which when desired for making into films and other materials is readily made irreversibly insoluble in water by heating in the presence of an oxidizing agent therefor, said allyl ethyl cellulose having 0.2 allyl group and 0.8–1.1 ethyl groups per anhydroglucose unit of cellulose.

References Cited in the file of this patent

UNITED STATES PATENTS

| | | |
|---|---|---|
| 2,232,927 | Peterson et al. | Feb. 25, 1941 |
| 2,336,985 | Freund | Dec. 14, 1943 |
| 2,414,144 | Ernsberger | Jan. 14, 1947 |
| 2,415,041 | Rust | Jan. 28, 1947 |
| 2,682,481 | Hewson | June 29, 1954 |